United States Patent
Krech et al.

(10) Patent No.: US 10,914,304 B2
(45) Date of Patent: Feb. 9, 2021

(54) PNEUMATIC TIMING VALVE

(71) Applicant: Graco Minnesota Inc., Minneapolis, MN (US)

(72) Inventors: Jacob K. Krech, Andover, MN (US); Corey D. Meyer, Prior Lake, MN (US); David J. Allie, Columbia Heights, MN (US); Daniel J. Rogers, Lindstrom, MN (US); Derek R. Shaw, Hopkins, MN (US); John R. Ingebrand, New Prague, MN (US); Joseph A. Daniski, Minnetonka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 122 days.

(21) Appl. No.: 15/140,715

(22) Filed: Apr. 28, 2016

(65) Prior Publication Data

US 2016/0319812 A1  Nov. 3, 2016

Related U.S. Application Data

(60) Provisional application No. 62/155,568, filed on May 1, 2015.

(51) Int. Cl.
*F16K 11/07* (2006.01)
*F04B 49/22* (2006.01)
(Continued)

(52) U.S. Cl.
CPC ............. *F04B 49/22* (2013.01); *E21B 43/16* (2013.01); *E21B 43/255* (2013.01); *F04B 7/02* (2013.01);
(Continued)

(58) Field of Classification Search
CPC ............ F16K 31/1221; F16K 11/0716; F16K 11/0712; F16K 31/1266; F16K 31/12;
(Continued)

(56) References Cited

U.S. PATENT DOCUMENTS 1,467,522 A * 9/1923 Amsler ................ G05D 7/0126
137/501
2,287,709 A * 6/1942 Ringman ................ F04B 47/04
417/904

(Continued)

OTHER PUBLICATIONS

CIP Chemical Injection Pump, The WellMark L.L.C., 2011, www.wellmarkco.com.

(Continued)

*Primary Examiner* — Craig J Price
(74) *Attorney, Agent, or Firm* — Kinney & Lange, P.A.

(57) ABSTRACT

A pneumatic timing valve includes a spool and seal system having a first seal cartridge and a spool. The first seal cartridge has an annular body with radial ports. The spool is positioned within the first seal cartridge and movable between a first and second position. The spool has a central bore and radial ports that intersect the central bore. The radial ports of the spool complement the radial ports of the seal cartridge. The seal cartridge radial ports, the spool radial ports, and the central bore of the spool define fluid flow passages.

15 Claims, 8 Drawing Sheets

(51) Int. Cl.
| | |
|---|---|
| *F16K 31/122* | (2006.01) |
| *F04B 19/22* | (2006.01) |
| *F04B 53/14* | (2006.01) |
| *F04B 53/10* | (2006.01) |
| *E21B 43/16* | (2006.01) |
| *F04B 7/02* | (2006.01) |
| *E21B 43/25* | (2006.01) |

(52) U.S. Cl.
CPC ............. *F04B 19/22* (2013.01); *F04B 53/10* (2013.01); *F04B 53/14* (2013.01); *F16K 11/0712* (2013.01); *F16K 11/0716* (2013.01); *F16K 31/1221* (2013.01); *Y10T 137/86702* (2015.04)

(58) Field of Classification Search
CPC .... F16K 31/122; F16K 31/1223; F16K 31/16; F16K 31/163; F16K 31/14; F16K 31/143; F16K 31/145; F16K 31/363; F04B 53/10; F04B 53/14; F04B 19/22; F04B 7/02; F04B 49/22; F15B 11/08; F15B 11/072; F15B 21/02; G05D 7/012; G05D 7/0126; G05D 7/0193; E21B 43/16; E21B 43/255; B01J 4/008; B03B 15/16; F02D 7/007; F02D 1/14; F02D 1/12; F02D 1/122; F02D 1/125; F02D 1/127; Y10T 137/86614; Y10T 137/8671; Y10T 137/2597; Y10T 137/86694; Y10T 137/86702
USPC .................. 137/102, 82–86, 565.01–565.36, 137/596–596.2, 625.2–625.69, 596.17, 137/596.18, 624.11–624.15, 627.5; 91/463, 450, 465, 274
See application file for complete search history.

(56) References Cited

U.S. PATENT DOCUMENTS

| | | | | |
|---|---|---|---|---|
| 2,354,562 | A * | 7/1944 | Webb | G01N 3/12 137/115.01 |
| 2,459,456 | A * | 1/1949 | Rockwell | F16K 31/1223 137/596.18 |
| 2,488,109 | A * | 11/1949 | Adams | B30B 15/16 60/379 |
| 2,512,730 | A * | 6/1950 | Adams | B30B 15/16 91/2 |
| 2,561,766 | A * | 7/1951 | Adams | B30B 15/0023 100/223 |
| 2,892,644 | A * | 6/1959 | Collins | F16J 15/32 251/324 |
| 3,017,901 | A * | 1/1962 | Hicks, Jr. | F16K 11/0712 251/331 |
| 3,199,540 | A * | 8/1965 | Forster | F16J 15/32 137/625.69 |
| 3,380,348 | A * | 4/1968 | Kroffke | F15B 11/15 137/624.14 |
| 3,385,166 | A * | 5/1968 | Kroffke | F15B 11/15 137/624.14 |
| 3,392,742 | A * | 7/1968 | Diver | F15B 11/02 137/625.66 |
| 3,418,002 | A * | 12/1968 | Hennells | F16K 3/26 137/625.69 |
| 3,444,849 | A * | 5/1969 | Bessiere | F02D 1/00 123/384 |
| 3,451,430 | A * | 6/1969 | Cowdin | F15B 13/0402 137/625.69 |
| 3,530,894 | A * | 9/1970 | Henzgen | F16K 11/07 137/625.6 |
| 3,561,324 | A * | 2/1971 | Obergfell | B25C 1/041 91/252 |
| 3,565,115 | A * | 2/1971 | Beckett | F15B 13/04 137/625.69 |
| 3,819,152 | A * | 6/1974 | Clippard, III | F15B 13/0402 137/625.48 |
| 4,018,249 | A | 4/1977 | Lameyre | |
| 4,100,937 | A * | 7/1978 | Mallory | C03B 9/406 137/596.16 |
| 4,167,262 | A * | 9/1979 | Lemmon | F16K 31/363 137/487.5 |
| 4,187,817 | A * | 2/1980 | Wilson | F02D 1/065 123/198 DB |
| 4,248,188 | A * | 2/1981 | Wilson | F02D 1/065 123/371 |
| 4,354,524 | A | 10/1982 | Higgins | |
| 4,370,996 | A * | 2/1983 | Williams | G05D 11/035 137/99 |
| 4,465,090 | A * | 8/1984 | Morgan | B01J 4/008 137/102 |
| 4,485,846 | A * | 12/1984 | Neff | F15B 13/043 137/454.2 |
| 4,491,155 | A | 1/1985 | Meyer et al. | |
| 4,529,004 | A | 7/1985 | Schadegg | |
| 4,869,219 | A * | 9/1989 | Bremmer | F02D 1/065 123/383 |
| 5,067,519 | A * | 11/1991 | Russell | F15B 11/068 137/107 |
| 5,092,746 | A * | 3/1992 | Henke | F16N 13/16 417/403 |
| 5,172,727 | A * | 12/1992 | Stoll | F16J 15/3252 137/625.66 |
| 5,190,078 | A * | 3/1993 | Stoll | F16K 11/0712 137/625.69 |
| 5,273,074 | A * | 12/1993 | Conradt | F15B 13/0402 137/269 |
| 5,329,956 | A | 7/1994 | Marriott et al. | |
| 5,337,787 | A * | 8/1994 | Fiondella | F16K 27/041 137/625.66 |
| 5,669,422 | A * | 9/1997 | Tarusawa | F15B 11/068 137/110 |
| 5,687,949 | A | 11/1997 | Dukas et al. | |
| 5,979,904 | A | 11/1999 | Balsells | |
| 6,729,346 | B2 * | 5/2004 | Fuhrmann | F15B 11/05 137/501 |
| 6,991,236 | B1 * | 1/2006 | Andrews | B60T 8/362 251/363 |
| 7,380,293 | B2 * | 6/2008 | Gilbertson | E03D 1/00 137/462 |
| 8,631,826 | B2 * | 1/2014 | Lovell | F15B 13/0405 137/596.14 |
| 8,689,832 | B2 * | 4/2014 | Lovell | F15B 13/0405 137/596.14 |
| 8,807,168 | B2 * | 8/2014 | Lovell | F15B 13/0405 137/596.14 |
| 9,625,042 | B2 * | 4/2017 | Wilfong | F16K 11/0712 |
| 9,925,969 | B2 * | 3/2018 | Gaughan | B60T 13/665 |
| 2004/0159497 | A1 | 8/2004 | Conley et al. | |
| 2004/0206397 | A1 | 10/2004 | Liberfarb | |
| 2013/0019958 | A1 * | 1/2013 | Miyazoe | F16K 11/02 137/115.1 |

OTHER PUBLICATIONS

Pneumatic Chemical Metering Pump, Timberline Manufacturing Company, 2013, www.tlinemfg.com.
Written Opinion & International Search Report, for PCT Application No. PCT/US2016/029687, dated Aug. 10, 2016, 18 pages.
International Preliminary Report on Patentability for PCT Application No. PCT/US2016/029687, dated Nov. 7, 2017, 14 pages.
First Examination Report for Australian Patent Application No. 2016257652, dated Oct. 30, 2019, 3 pages.

* cited by examiner

PNEUMATIC TIMING VALVE

CROSS-REFERENCE TO RELATED APPLICATION

This application claims priority to U.S. Provisional Application No. 62/155,568 filed on May 1, 2015, and entitled "PNEUMATIC TIMING VALVE," the entire contents of which are hereby incorporated by reference in their entirety.

BACKGROUND

The present disclosure relates to timing valves, and more particularly, to pneumatic timing valves. Timing valves are used to control the rate at which fluid is dispensed by a reciprocating pump. Timing valves accomplish this by controlling the rate at which the pump reciprocates. The pump's reciprocation rate determines the rate at which fluid is dispensed by the pump. Timing valves control a pump's rate of reciprocation by controlling how frequently the pump alternates between receiving actuating fluid and exhausting actuating fluid. This control is achieved by the timing valve alternating between a supply state and an exhaust state. In the supply state, the pneumatic timing valve supplies actuating fluid to the pneumatic pump and the pneumatic pump dispenses fluid by executing a forward stroke. In the exhaust state, the pneumatic timing valve allows the pneumatic pump to exhaust actuating fluid to an exhaust port allowing the pneumatic pump to execute a return stroke. The more frequently the timing valve alternates between the supply state and the exhaust state, the more frequently the pump reciprocates. The more frequently the pump reciprocates, the greater the rate of fluid dispensing.

Existing pneumatic timing valves utilize a spring biased piston in contact with a diaphragm to alternate between the supply state and the exhaust state. When the pneumatic timing valve is in the supply state, a spring biases a piston so that actuating fluid may flow from a fluid supply to a pneumatic pump. In the supply state, the piston is also biased against a first surface so that fluid cannot flow from the fluid supply to a fluid exhaust port. In the supply state, pressure builds on a side of the diaphragm opposite the piston. When the pressure is great enough, the force on the diaphragm overcomes the spring and shifts the piston to its position in the exhaust state. In the exhaust state, fluid flows from the pneumatic pump and from an area adjacent to the diaphragm to the fluid exhaust port. In this state, the piston also cuts off flow from the fluid supply. When the timing valve is in the exhaust state, the piston sits against a second surface and prevents fluid from flowing to the fluid exhaust port from the fluid supply. Once the pressure on the diaphragm is reduced, the spring biases the piston back into its position in the supply state and the cycle repeats. A drawback to this design is that fluid may leak from the fluid supply to the fluid exhaust port while the piston moves from its position in the supply state to its position in the exhaust state.

SUMMARY

One embodiment of the present invention includes a pneumatic timing valve. The pneumatic timing valve comprises a housing, a spool positioned within the housing, a pressurization chamber, and a spring. The housing comprises a main bore having a first end and second end, a fluid inlet port, a fluid inlet passage that connects the fluid inlet port and the main bore, a fluid outlet port, a fluid outlet passage that connects the fluid outlet port and the main bore, and a fluid exhaust port that intersects the main bore. The spool is movable between a first position and a second position. The spool comprises fluid passages configured to connect the fluid inlet passage to the fluid outlet passage when the spool is in the first position and to connect the fluid outlet passage and the exhaust port when the spool is in the second position. The pressurization chamber is defined in the main bore between the first end of the main bore and the spool. The spring is positioned so that it biases the spool toward the pressurization chamber.

A second embodiment of the present disclosure includes a fluid dispensing system. The fluid dispensing system comprises a pneumatic pump and a pneumatic timing valve that controls pump speed. The pneumatic timing valve comprises a housing, a spool positioned within the housing, a pressurization chamber, and a spring. The housing comprises a main bore having a first end and second end, a fluid inlet port, a fluid inlet passage that connects the fluid inlet port and the main bore, a fluid outlet port, a fluid outlet passage that connects the fluid outlet port and the main bore, and a fluid exhaust port that intersects the main bore. The spool is movable between a first position and a second position. The spool comprises fluid passages configured to connect the fluid inlet passage to the fluid outlet passage when the spool is in the first position and to connect the fluid outlet passage and the exhaust port when the spool is in the second position. The pressurization chamber is defined in the main bore between the first end of the main bore and the spool. The spring is positioned so that it biases the spool toward the pressurization chamber.

A third embodiment of the present disclosure includes a spool and seal system. The spool and seal system comprises a first seal cartridge and a spool. The first seal cartridge has an annular body with radial ports. The spool is positioned within the first seal cartridge and movable between a first and second position. The spool has a central bore and radial ports that intersect the central bore. The radial ports of the spool complement the radial ports of the seal cartridge. The seal cartridge radial ports, the spool radial ports, and central bore of the spool define fluid flow passages.

DETAILED DESCRIPTION

Figure 1:
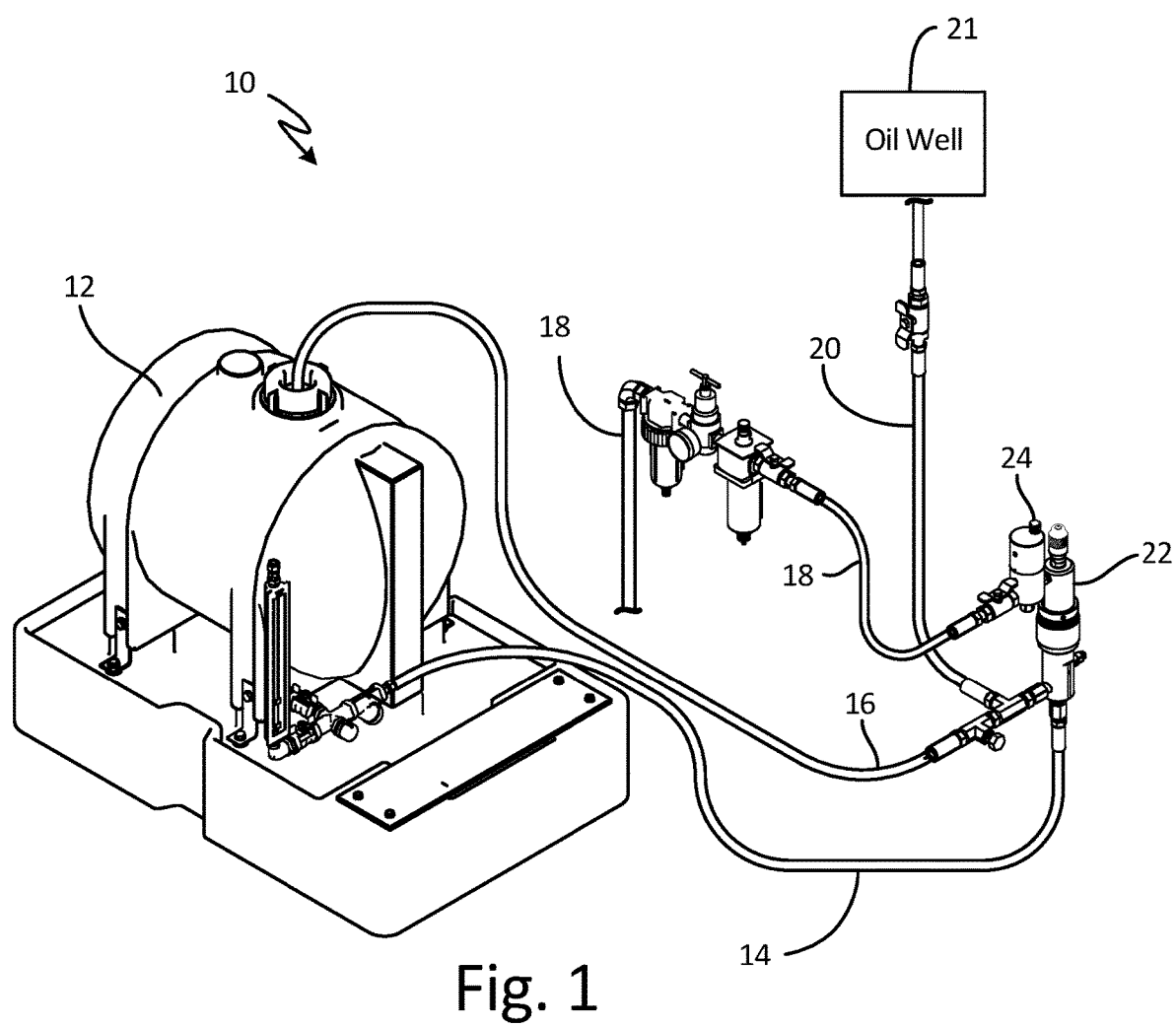
FIG. 1 is a perspective view of a fluid dispensing system.

FIG. 1 shows a perspective view of a fluid dispensing system 10. Fluid dispensing system 10 is an example of a fluid dispensing system used to dispense chemicals into an oil well. Fluid dispensing system 10 has chemical tank 12, chemical supply line 14, chemical return line 16, fluid supply line 18, chemical dispensing line 20, pneumatic pump 22, and pneumatic timing valve 24. Pneumatic pump 22 is a reciprocating piston type pump. Chemical tank 12 provides chemicals to pneumatic pump 22 through chemical supply line 14. Chemicals are able to return to chemical tank 12 through chemical return line 16, which also connects chemical tank 12 and pneumatic pump 22. Chemical dispensing line 20 connects pneumatic pump 22 to oil well 21 allowing pneumatic pump 22 to inject chemicals into the well. Fluid supply line 18 connects pneumatic timing valve 24 to a supply of air or gas. Pneumatic timing valve 24 is connected to pneumatic pump 22 by fitting 26 (shown in FIG. 2). Pneumatic timing valve 24 connects pneumatic pump 22 to the supply of air or gas. Pneumatic timing valve 24 controls the rate at which pneumatic pump 22 dispenses chemicals. Pneumatic timing valve 24 controls the dispense rate of pneumatic pump 22 by regulating the rate at which pneumatic pump 22 reciprocates. Pneumatic timing valve 24 controls the reciprocation rate of pneumatic pump 22 by controlling whether pneumatic pump 22 is receiving fluid or is exhausting fluid. Pneumatic timing valve 24 accomplishes this by alternating between a supply state and an exhaust state. In the supply state, pneumatic timing valve 24 supplies fluid to pneumatic pump 22. In the exhaust state, pneumatic timing valve 24 allows pneumatic pump 22 to exhaust fluid.

Figure 2:
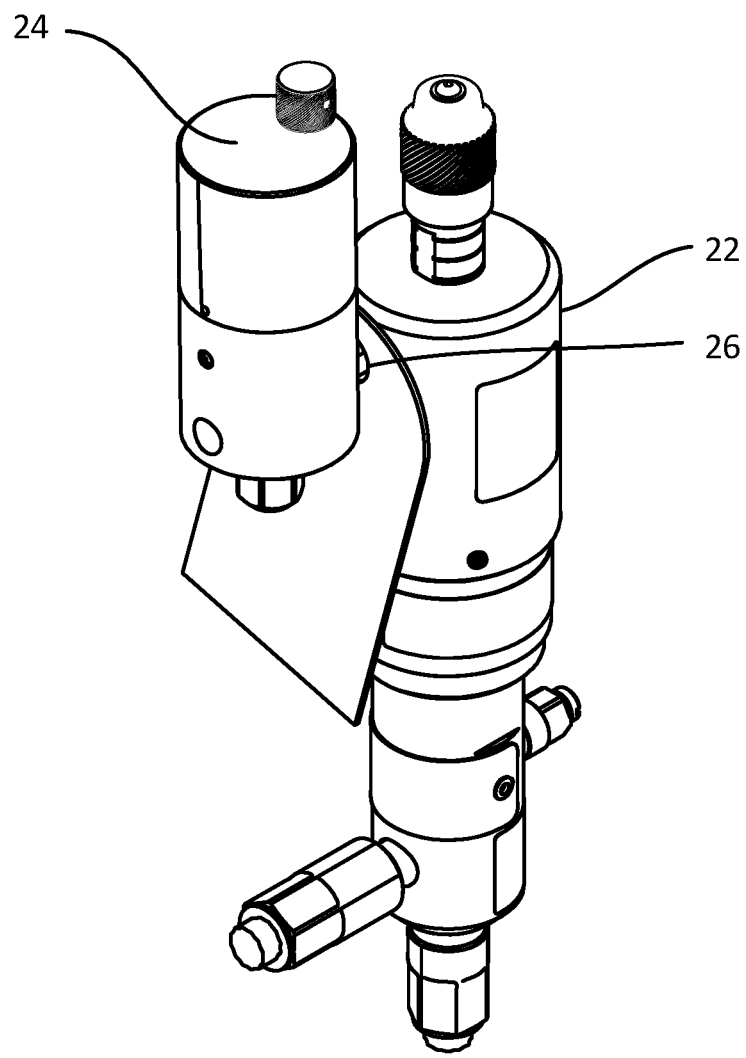
FIG. 2 is a perspective view of the pneumatic pump and the pneumatic timing valve of the fluid dispensing system of FIG. 1.

FIG. 2 is a perspective view of pneumatic pump 22 connected to pneumatic timing valve 24 by fitting 26. The supply of air or gas from fluid supply line 18 (shown in FIG. 1) drives both pneumatic pump 22 and pneumatic timing valve 24. Fitting 26 allows pneumatic pump 22 to receive air or gas from fluid supply line 18 when pneumatic timing valve 24 is in the supply state. Fitting 26 also allows pneumatic pump 22 to exhaust air or gas back to pneumatic timing valve 24 when pneumatic timing valve 24 is in the exhaust state.

In one embodiment, pneumatic pump 22 is a reciprocating piston pump. Pneumatic pump 22 has a piston that is driven by fluid pressure. The piston is biased by a spring to a starting position. The piston executes a forward stroke when the piston is exposed to a high enough pressure causing the pump to dispense chemicals to an oil well. The spring drives the piston back to the starting position when the piston is no longer exposed to pressure. In the absence of a high enough pressure, the spring causes the piston to execute a return stroke expelling the fluid that caused the pump to execute the forward stroke.

Pneumatic timing valve 24 includes a needle valve assembly that controls the rate at which the pneumatic timing valve alternates between the supply state and the exhaust state. The needle valve assembly controls the rate at which pneumatic pump 22 reciprocates by controlling the rate at which pneumatic timing valve 24 alternates between the supply state and the exhaust state. The needle valve assembly accomplishes this by controlling the rate at which fluid flows into and out of a pressurization chamber within pneumatic timing valve 24. In the supply state, fluid flows through pneumatic timing valve 24 to pneumatic pump 22. In this state, fluid also flows past the needle valve assembly and into the pressurization chamber where pressure builds. This pressure results in a downward force on a spool that moves within pneumatic timing valve 24. The spool is biased into its position in the supply state by a bias spring. Once the pressure in the pressurization chamber is high enough, the downward force on the spool is large enough to overcome the bias force of the bias spring. This results in the bias spring being compressed and the spool moving to its position in the exhaust state. Once the spool has moved, pneumatic timing valve 24 has entered the exhaust state.

In the exhaust state, fluid flows from pneumatic pump 22 and from the pressurization chamber to the atmosphere through an exhaust port. Once the pressure in the pressurization chamber is low enough, the bias spring moves the spool back into its position in the supply state. Once pneumatic timing valve 24 has entered the supply state, the cycle will repeat. In the exhaust state, the needle valve assembly controls the rate at which fluid flows out of the pressurization chamber.

The needle valve assembly controls how long pneumatic timing valve 24 remains in the supply state and the exhaust state by controlling the rate of fluid flow into and out of the pressurization chamber. The longer it takes for the pressurization chamber to fill and empty, the less frequently pneumatic timing valve 24 will alternate between the supply state and the exhaust state. This will cause pneumatic pump 22 to reciprocate less frequently and to dispense chemicals at a lower rate. The less time it takes for the pressurization chamber to fill and empty, the more quickly pneumatic timing valve 24 will alternate between the supply state and the exhaust state. This will cause pneumatic pump 22 to reciprocate more frequently and to dispense chemicals at a higher rate. The needle valve assembly is adjustable so that an operator may control the rate of chemical dispensing by setting the rate at which fluid flows into and out of the pressurization chamber. This allows an operator to control how quickly pneumatic pump 22 reciprocates by controlling how quickly timing valve 24 alternates between the supply state and exhaust state.

Pneumatic pumps and pneumatic timing valves provide a non-electric means of dispensing fluids at controlled rates. This makes pneumatic pumps and pneumatic timing valves advantageous in areas with limited access to electricity. For example, pneumatic timing valve 24 moves without any electrical actuation. Pneumatic pump 22 and pneumatic timing valve 24 may even be operated using gas from the oil well into which chemicals are injected. In some cases, the gas from the well is also used for other purposes or is captured and sold. Thus, it is important that pneumatic pump 22 and pneumatic timing valve 24 operate efficiently so that the air or gas may be captured or used for other purposes.

Figure 3A:
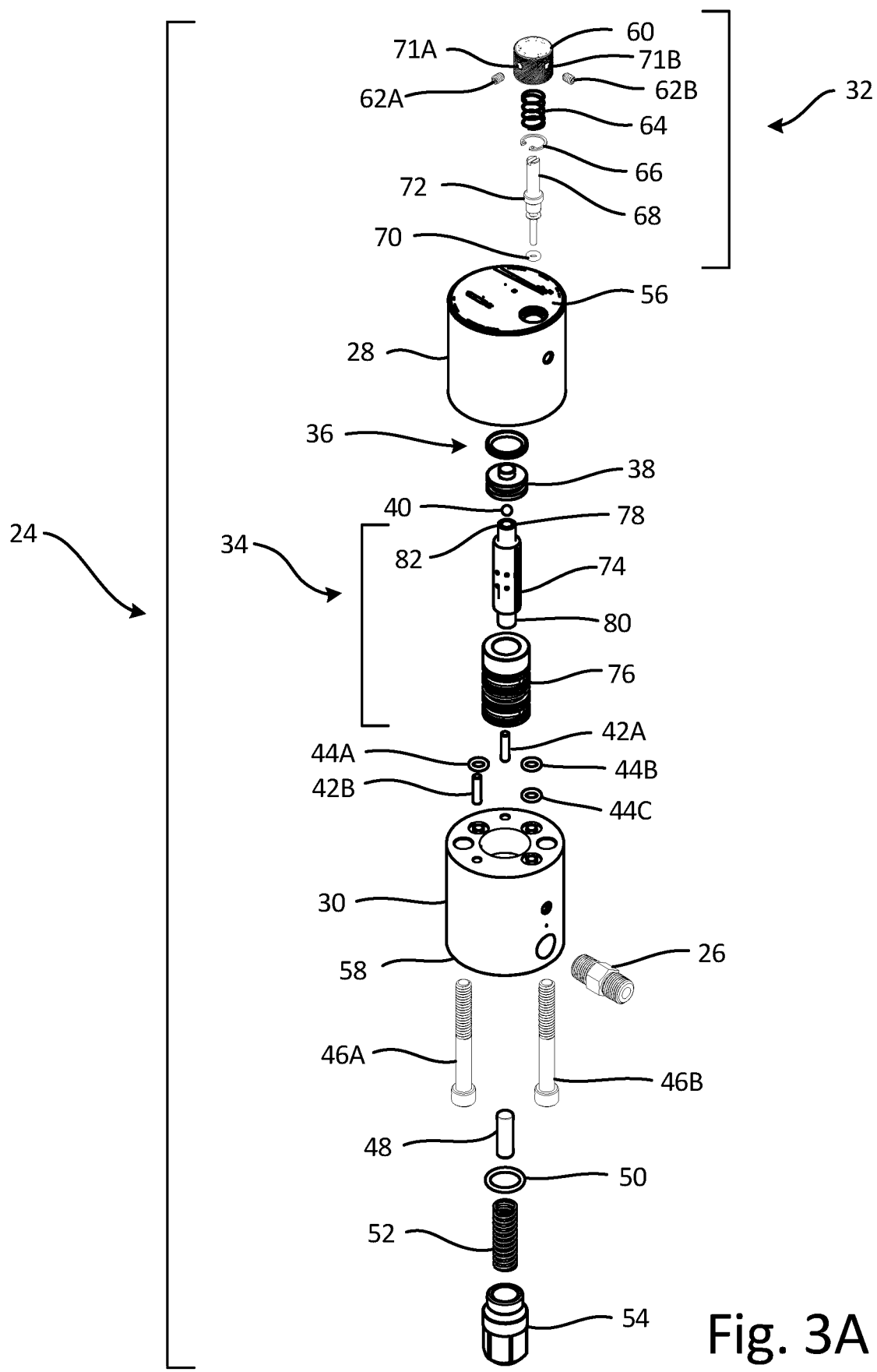
FIG. 3A is an exploded view of the pneumatic timing valve of FIG. 2.

FIG. 3A is an exploded view of pneumatic timing valve 24. Pneumatic timing valve 24 has fitting 26, upper housing portion 28, lower housing portion 30, needle valve assembly 32, spool and seal assembly 34, piston seal 36, piston 38, ball 40, dowel pins 42A and 42B, housing o-rings 44A, 44B, and 44C, screws 46A and 46B, retainer pin 48, retainer o-ring 50, spring 52, and spring retainer 54. Upper housing portion 28 has first end 56. Lower housing portion 30 has second end 58. Needle valve assembly 32 has control knob 60, set screws 62A and 62B, control spring 64, retaining ring 66, needle 68, and needle o-ring 70. Control knob 60 has set screw holes 71A and 71B. Needle 68 has needle threads 72. Spool and seal system 34 has spool 74 and seal assembly 76. Spool 74 has first end 78, second end 80, and opening 82.

When pneumatic timing valve 24 is assembled, upper housing portion 28 and lower housing portion 30 are connected by dowel pins 42A and 42B and screws 46A and 46B. Housing o-rings 44A, 44B, and 44C are positioned on top of lower housing portion 30 and seal passages in upper housing portion 28 and lower housing portion 30. Spring retainer 54 threads into second end 58 of lower housing portion 30 and retains retainer pin 48 and spring 52. Retainer o-ring 50 is positioned on spring retainer 54 and seals the threaded connection of spring retainer 54 and lower housing portion 30. Piston seal 36 is positioned on piston 38. Piston 38 is positioned in main bore 84 (shown in FIG. 3B) of pneumatic timing valve 24. Ball 40 is positioned in spool opening 82 in first end 78 of spool 74. Spool 74 is positioned inside the annular space of seal assembly 76. Spool and seal system 34 is positioned in main bore 84 of pneumatic timing valve 24.

When pneumatic timing valve 24 is assembled, needle valve assembly 32 is assembled and is installed in upper housing portion 28. Needle 68 is positioned in fluid outlet passage 88 (shown in FIG. 3B) of pneumatic timing valve 24 where needle threads 72 are received by housing threads 98 (shown in FIG. 3B). Needle 68 extends out of upper housing portion 32. Control knob 60 receives needle 68 and is positioned above upper housing portion 28. Set screws 62A and 62B are threaded into set screw holes 71A and 71B and contact needle 68. Control spring 64 is positioned around needle 68 and is positioned below needle control knob 60 and above needle threads 72. Retaining ring 66 is positioned within fluid outlet passage 92 below control spring 64 and above needle threads 72. Needle o-ring 70 is positioned on needle 68 below needle threads 72.

Figure 3B:
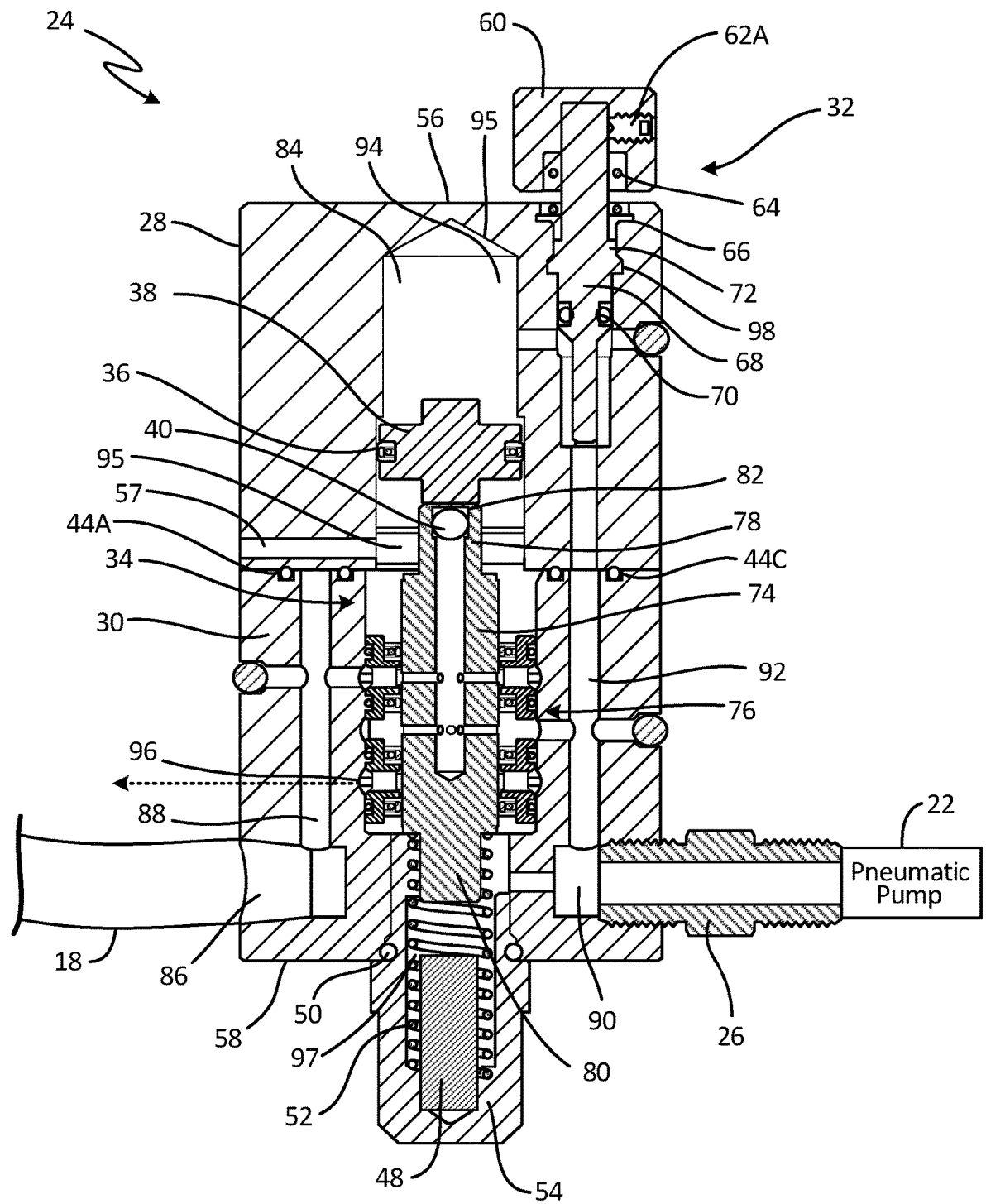
FIG. 3B is a cutaway view of the pneumatic timing valve with a spool in a first position.

FIG. 3B is a cutaway view of a fully assembled pneumatic timing valve 24 connected to fluid supply line 18 and pneumatic pump 22. Many of the parts shown in FIG. 3A are also shown in FIG. 3B. Some parts are omitted because they cannot be seen in the cutaway view of FIG. 3B. FIG. 3B shows some parts of pneumatic timing valve 24 that could not be seen in FIG. 3A. Pneumatic timing valve 24 has fitting 26, upper housing portion 28, lower housing portion 30, needle valve assembly 32, spool and seal assembly 34, piston seal 36, piston 38, ball 40, housing o-rings 44A and 44C, retainer pin 48, retainer o-ring 50, return spring 52, spring retainer 54, main bore 84, fluid inlet port 86, fluid inlet passage 88, fluid outlet port 90, fluid outlet passage 92, pressurization chamber 94, vented chamber 95, and exhaust port 96. Upper housing portion 28 has housing first end 56 and vent hole 57. Lower housing portion 30 has housing second end 58. Needle valve assembly 32 has control knob 60, set screw 62A, control spring 64, retaining ring 66, needle 68, and needle o-ring 70. Needle 68 has needle threads 72. Spool and seal assembly 34 has spool 74 and seal assembly 76. Spool 74 has first end 78, second end 80, and opening 82. Main bore 84 has first end 95 and second end 97. Fluid outlet passage 92 has housing threads 98 for receiving needle threads 72 of needle 68.

Fitting 26 is connected to pneumatic timing valve 24 at fluid outlet port 90 by a threaded connection. Fitting 26 also connects pneumatic timing valve 24 to pneumatic pump 22. Upper housing portion 28 and lower housing portion 30 are connected by dowel pins 42A and 42B (shown in FIG. 3A) and screws 46A and 46B (shown in FIG. 3A). Needle valve assembly 32 is installed in upper housing portion 28. Needle 68 is positioned partly in fluid outlet passage 92. Needle threads 72 of needle 68 are received by housing threads 98 of fluid outlet passage 92. Control knob 60 receives needle 68 and is positioned on top of upper housing portion 28. Set screw 62A and set screw 62B (shown in FIG. 3A) are threaded into set screw holes 71A and 71B (shown in FIG. 3A) and contact needle 68 and cause needle 68 to rotate when control knob 60 rotates. Control spring 64 is positioned around needle 68 between control knob 60 and needle threads 72. Control spring 64 keeps tension on control knob 60 and prevents control knob 60 from rotating due to vibration or forces other than a rotational force applied by an operator. Retaining ring 66 is positioned in fluid outlet passage 92 below control knob 60 and above needle threads 72. Retaining ring 66 prevents needle 68 from being removed from fluid outlet passage 92 due to over rotation of control knob 60. Needle o-ring 70 is positioned in fluid outlet passage 92 below needle threads 72. Needle o-ring 70 prevents fluid from flowing past needle threads 72 and to the atmosphere. Needle threads 72 are received by housing threads 98. Needle threads 72 and housing threads 98 allow needle 68 to move further into fluid outlet passage 92 when control knob 60 is rotated in one direction. Needle threads 72 and housing threads 98 allow needle 68 to partially withdraw from fluid outlet passage 92 when control knob 60 is rotated in the opposite direction.

Spool and seal system 34 is positioned within main bore 84. Spool 74 is positioned within the annular space of seal assembly 76. Piston seal 36 is positioned on piston 38. Vent hole 57 extends through upper housing portion 28 into main bore 84. Piston 38 is in contact with first end 78 of spool 74. Ball 40 is positioned within opening 82 in first end 78 of spool 74. Housing o-rings 44A and 44C are positioned between upper housing portion 28 and lower housing portion 30. Housing o-ring 44A seals fluid inlet passage 88. Housing o-ring 44C seals fluid outlet passage 92. Retainer pin 48 is positioned within spring retainer 54 below spool 74. Retainer o-ring 50 is positioned between spring retainer 54 and lower housing portion 30. Retainer o-ring 50 seals the connection of lower housing portion 30 and spring retainer 54. Spring 52 is positioned around retainer pin 48 and second end 80 of spool 74 and is in contact with spring retainer 54 and spool 74. Main bore 84 extends from first end 95 of main bore 84 to second end 97 of main bore 84. Pressurization chamber 94 is defined in main bore 84 by piston 38 and first end 95 of main bore 84. Vented chamber 95 is in main bore 84 between piston 38 and seal assembly 76. Vented chamber 95 is in communication with an inner end of vent hole 57 to connect vented chamber 95 to the atmosphere.

Fluid inlet port 86 extends into lower housing portion 30. Fluid supply line 18 connects to pneumatic timing valve 24 at fluid supply line 18. Fluid inlet passage 88 connects fluid inlet port 86 to main bore 84. Fluid outlet port 90 extends into lower housing portion 30. Fluid outlet passage 92 connects fluid outlet port 90 to main bore 84. Fluid outlet passage 92 also connects main bore 84 to pressurization chamber 94. Main bore 84 connects fluid inlet passage 88 to fluid outlet passage 92 allowing fluid to flow from fluid inlet port 86 to fluid outlet port 90 and vice versa. Exhaust port 96 extends through lower housing portion 30 and connects main bore 84 to the atmosphere. This arrangement also allows fluid to flow from fluid inlet port 86 to pressurization chamber 94 and from pressurization chamber 94 to exhaust port 96.

Needle valve assembly 32 allows an operator to control how quickly fluid flows past needle 68. This controls how quickly pressurization chamber 94 fills and how quickly pressurization chamber 94 empties. A more thorough discussion of the operation of needle valve assembly 32 is included in the discussion of FIGS. 6A and 6B.

Figure 4:
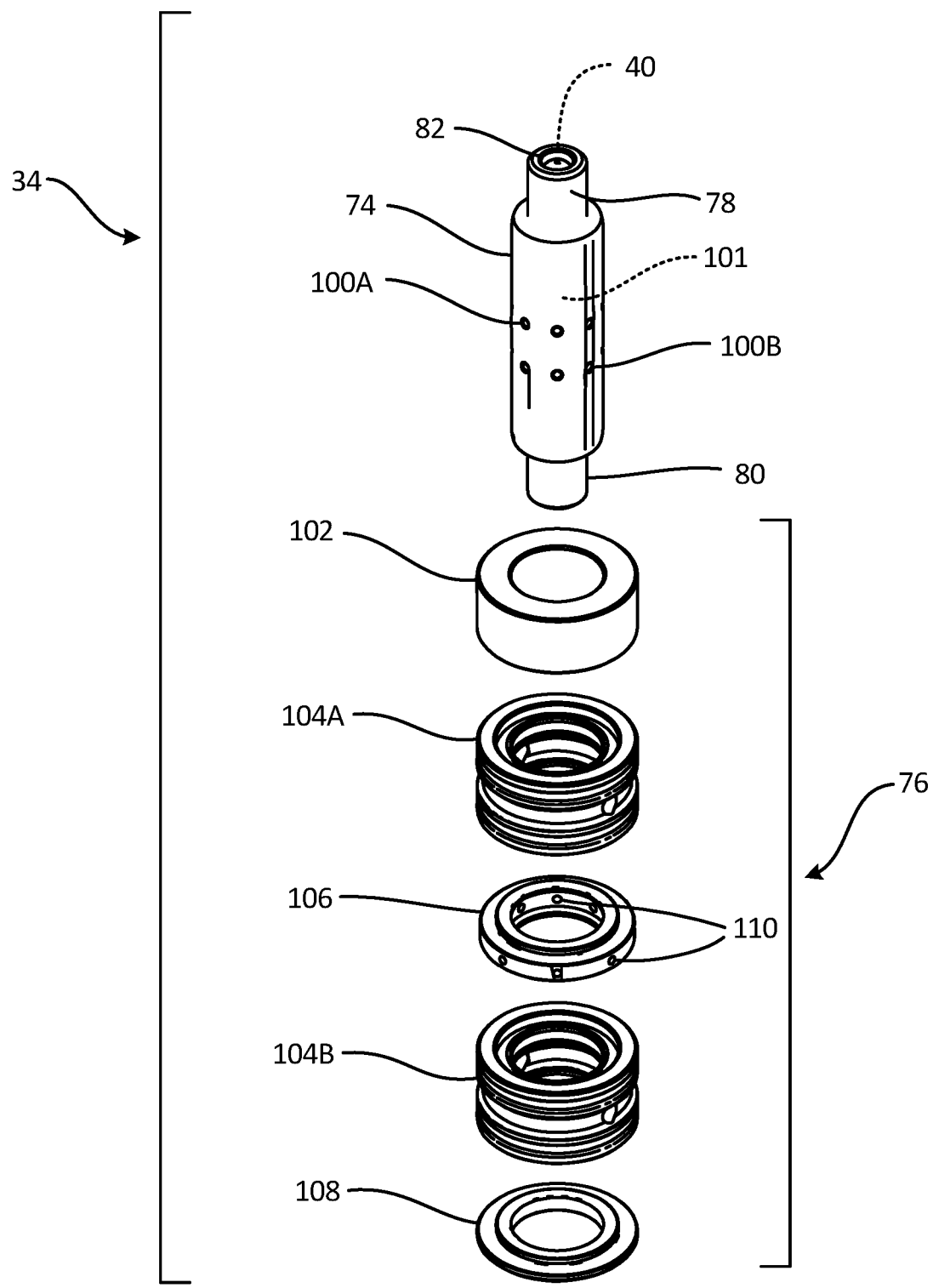
FIG. 4 is an exploded view of a spool and seal system of the pneumatic timing valve.

FIG. 4 is an exploded view of spool and seal system 34 shown in FIGS. 3A and 3B. Spool and seal system 34 has spool 74 and seal assembly 76. Spool 74 has first end 78, second end 80, opening 82, spool radial ports 100A and 100B, and central bore 101 (shown in FIGS. 6A and 6B). Seal assembly 76 has first seal cartridge retainer 102, seal cartridges 104A and 104B, seal cartridge spacer 106, and second seal cartridge retainer 108. Seal cartridge spacer 106 has spacer radial ports 110. Spool opening 82 is located in first end 78 of spool 74. Spool radial ports 100A and 100B are separated by a distance extending axially along spool 74. In one embodiment of the present disclosure, spool 74 comprises polytetrafluoroethylene filled acetal homopolymer. In one embodiment of the present disclosure, seal cartridges 104A and 104B and seal cartridge spacer 70 comprise acetal. This choice of material for spool 74 provides advantages described in the discussion of FIG. 5 below.

Figure 5:
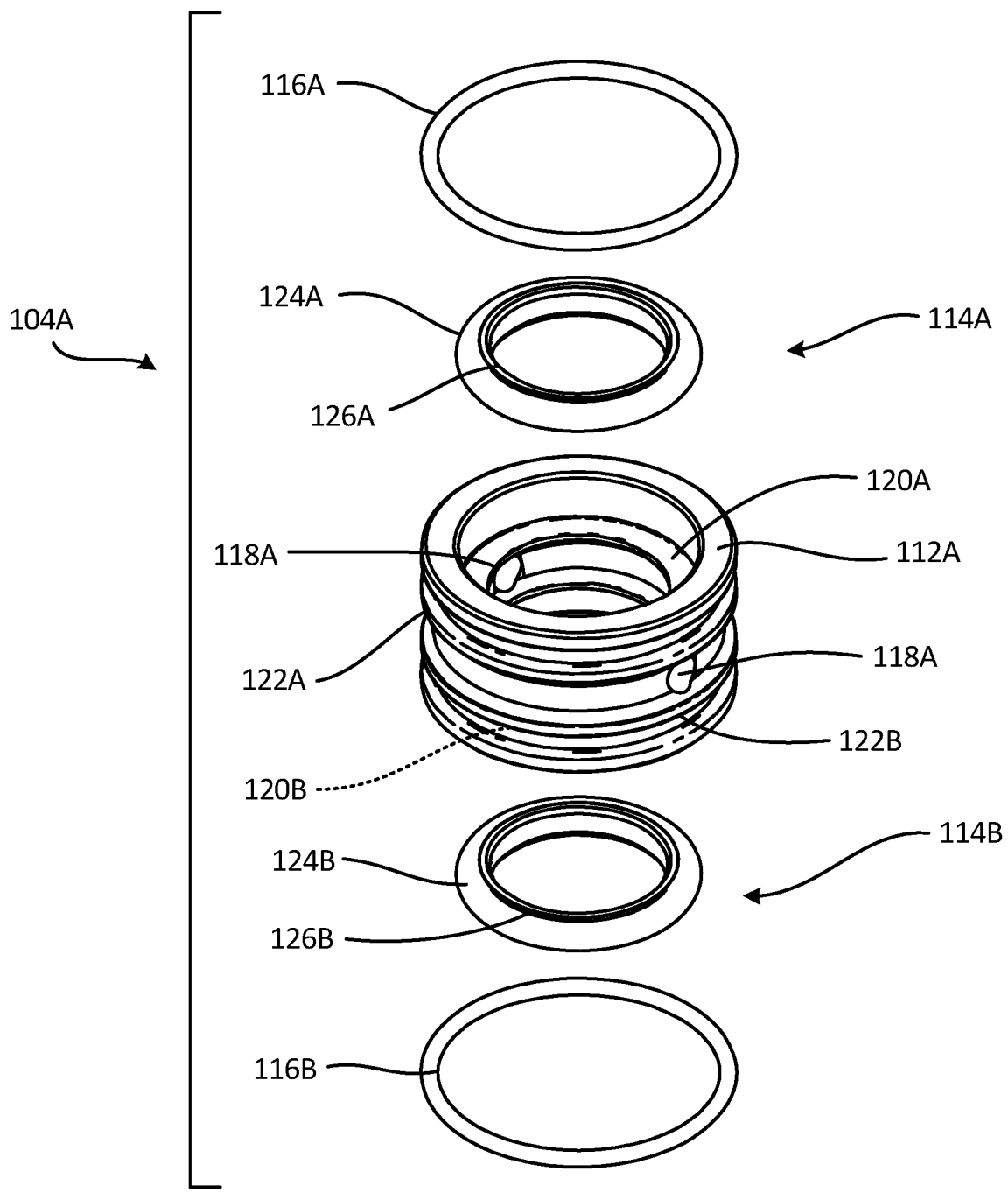
FIG. 5 is an exploded view of a seal cartridge of the spool and seal system of FIG. 4.

FIG. 5 is an exploded view of seal cartridge 104A of spool and seal system 34 (shown in FIG. 4). Seal cartridge 104A is identical to seal cartridge 104B (shown in FIG. 4). For this reason, a description of seal cartridge 104B is omitted. Seal cartridge 104A has annular body 112A, seal cartridge seals 114A and 114B, and seal cartridge o-rings 116A and 116B. Annular body 112A has cartridge radial ports 118A, seal cartridge seal seats 120A and 120B, and seal cartridge o-ring seats 122A and 122B. Seal cartridge seals 114A and 114B have seal cartridge energizer o-rings 124A and 124B and cartridge seal rings 126A and 126B respectively. Cartridge seal rings 126A and 126B comprise an oil filled ultra-high-molecular-weight polyethylene.

Seal cartridge seals 114A and 114B are positioned on cartridge seal seats 120A and 120B respectively. Seal cartridge o-rings 116A and 116B are positioned in seal cartridge o-ring seats 122A and 122B respectively. When spool 74 is installed in annular body 112A of seal cartridge 104A, seal rings 126A and 126B are pushed against spool 74 by seal cartridge energizer o-rings 124A and 124B respectively. This causes seal rings 126A and 126B to seal against spool 74 and prevent fluid from flowing past seal cartridge 104A between seal cartridge 104A and spool 74.

Figure 6A:
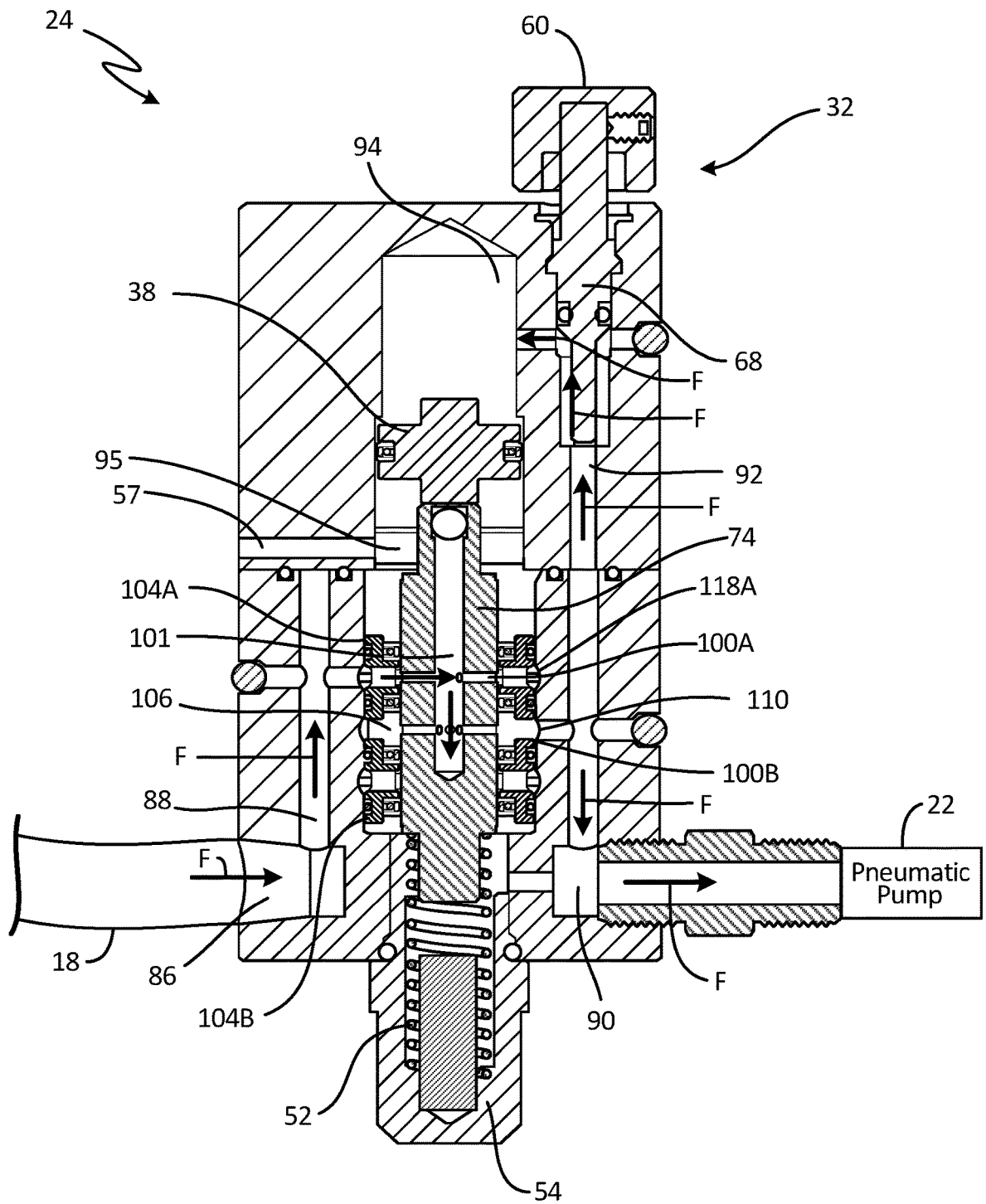
FIG. 6A is a cutaway view of the pneumatic timing valve showing how fluid flows through the pneumatic timing valve when the spool is in the first position.
Figure 6B:
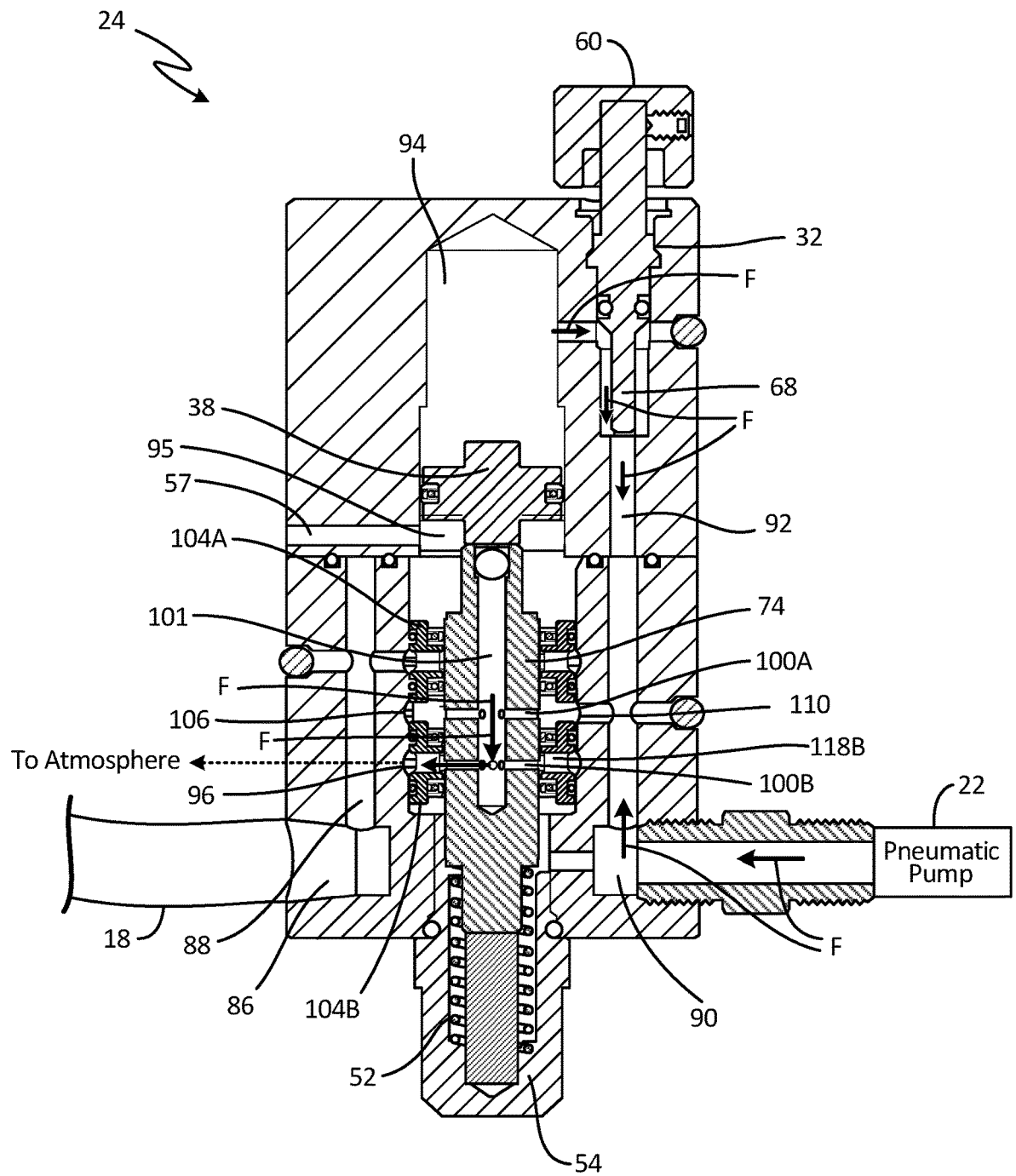
FIG. 6B is a cutaway view of the pneumatic timing valve showing how fluid flows through the pneumatic timing valve when the spool is in a second position.

This sealing arrangement is advantageous because cartridge seal rings 126A and 126B comprising oil filled ultra-high-molecular-weight polyethylene contact spool 74 comprising polytetrafluoroethylene filled acetal homopolymer. This combination of materials provides a low friction gliding seal. This sealing arrangement also eliminates the need for grease in the spool and seal system. This results in more consistency in the movement of spool 74 over time as grease can dry out. Grease drying out can result in changes to the resistance of the movement of spool 74. More or less resistance to the movement of spool 74 changes the speed at which spool 74 will move resulting in inconsistencies in the operation of pneumatic timing valve 24 (shown in FIG. 2). The absence of grease also allows pneumatic timing valve 24 to operate more consistently through a wider range of temperatures. This is because changes in temperatures can result in changes in the viscosity of grease which could affect the movement of spool 74. FIGS. 3A, 3B, 4, and 5 have depicted all the parts of pneumatic timing valve 24 and how they are connected. FIGS. 6A and 6B depict how pneumatic timing valve 24 operates.

FIG. 6A is a cutaway view of pneumatic timing valve 24 in the supply state connected to fluid supply line 18 and pneumatic pump 22. FIG. 6A demonstrates how fluid F flows through pneumatic timing valve 24 in the supply state. A recitation of all the parts of pneumatic timing valve 24 is omitted as these parts have been discussed above. In the supply state, pneumatic timing valve 24 supplies fluid F from fluid supply line 18 to pneumatic pump 22 through fitting 26. In the supply state, fluid F flows from fluid supply line 18 to fluid inlet port 86. Fluid F then flows from fluid inlet port 86 to fluid inlet passage 88 and into seal cartridge 104A through cartridge radial port 118A. In the supply state, spool 74 is positioned so that spool radial ports 100A are aligned with seal cartridge radial ports 118A of seal cartridge 104A. This alignment allows fluid to flow from fluid inlet passage 88 into seal cartridge 104A through seal cartridge radial port 118A and into spool 74 through spool radial ports 100A. Once fluid has entered spool 74, it will flow through central bore 101 to spool radial ports 100B which are aligned with spacer radial ports 110 of spacer 106. In the supply state, spool radial ports 100B are aligned with spacer radial ports 110. The alignment of spacer radial ports 110 with spool radial ports 100B allows fluid F to flow into spacer 106 through spacer radial ports 110 and into fluid outlet passage 92. Once fluid F has entered fluid outlet passage 92, it can flow to pneumatic pump 22 through fluid outlet port 90. Fluid F flowing to pneumatic pump 22 causes pneumatic pump 22 to dispense chemicals by executing a forward stroke.

Fluid F in fluid outlet passage 92 can also flow past needle valve assembly 32 to pressurization chamber 94. When fluid F is flowing to pressurization chamber 94, pressure builds in pressurization chamber 94. This pressure results in a downward force on piston 38 and spool 74. At this time, pressure is also building between spring retainer 54 and spool 74 resulting in an upward force on spool 74. However, the surface area of the upper face of piston 38 exposed to pressure is larger than the surface area of spool 74 that is exposed to pressure. This results in a net downward force on spool 74. When the pressure is high enough, the downward force on spool 74 is large enough to overcome the spring force of spring 52. Once the spring force of spring 52 is overcome, spring 52 is compressed and spool 74 moves downward. This causes pneumatic timing valve 24 to enter the exhaust state which is depicted in FIG. 6B. In the exhaust state, pneumatic pump 22 (shown in FIG. 2) is no longer receiving fluid from pneumatic timing valve 24. Instead, fluid F is flowing from pneumatic pump 22 to pneumatic timing valve 24 through fitting 26 and fluid outlet port 90. Vented chamber 95 is between pressurization chamber 94 and spool radial ports 100A. Atmospheric fluid flows in and out of vented chamber 95 such that vented chamber 95 is at atmospheric pressure, preventing a pressure build up below pressurization chamber 95 and piston 38 and allowing pneumatic timing valve 24 to function properly.

FIG. 6B is a cutaway view of pneumatic timing valve 24 in the exhaust state connected to fluid supply line 18 and pneumatic pump 22. A recitation of all the parts of FIG. 6B is omitted because all the parts have been previously described. In the exhaust state, spool 74 is positioned so that fluid from fluid F supply line 18 does not flow into pneumatic timing valve 24. In this state, pneumatic timing valve 24 connects pneumatic pump 22 and pressurization chamber 94 to the atmosphere. This allows pneumatic pump 22 to execute a return stroke expelling fluid F from pump 22 through fitting 26 to pneumatic timing valve 24 and to the atmosphere through exhaust port 96. In the exhaust state, fluid F flows from pneumatic pump 22 to fluid outlet port 90 and into fluid outlet passage 92. Fluid F also flows from pressurization chamber 94 to fluid outlet passage 92. In the exhaust state, fluid F that enters fluid outlet passage 92 flows to spacer radial port 110. Fluid F that enters spacer radial port 110 flows through spacer 106 and into spool 74 through spool radial port 100A. From spool radial port 100A fluid F will flow through central bore 101 and into spool radial port 100B. Fluid F will then flow from spool radial port 100B to the atmosphere through exhaust port 96 which extends through housing 26. Once enough fluid F has been exhausted from pressurization chamber 94, the pressure in pressurization chamber 94 will be low enough that the spring force of spring 52 will move piston 38 and spool 74 back into their positions in the supply state (shown in FIG. 6A). Once this occurs, timing valve 24 will again be in the supply state and the cycle will repeat.

The design of pneumatic timing valve 24 shown in FIGS. 6A and 6B results in greater efficiency over previous designs. This is because the design of pneumatic timing valve 24 prevents fluid F from flowing from fluid supply line 18 to exhaust port 96 as soon as spool radial ports 100A are no longer aligned with seal cartridge radial ports 118A. FIGS. 6A and 6B demonstrate that spool 74 moves only a small distance before the flow of fluid F from fluid supply line 20 is cut off. This results in little fluid F being leaked to the atmosphere through exhaust port 96. The use of spool 74 also avoids the use of a diaphragm as seen in previous designs. Compared to using a diaphragm, the spool results in a more robust timing valve as diaphragms can become worn and lose their elasticity over time.

FIGS. 6A and 6B also allow for a more complete understanding of how needle valve assembly 32 is used to control the reciprocation rate of pneumatic pump 22. Needle valve assembly 32 is discussed in detail in FIGS. 3A and 3B. Needle valve assembly 32 allows an operator to control how quickly pneumatic timing valve 24 alternates between the supply state and the exhaust state. This is accomplished through rotation of control knob 60 which causes needle 68 to move further into or withdraw from fluid outlet passage 92. Rotation of control knob 60 in one direction will cause needle 68 to move further into fluid outlet passage 92. Rotation of control knob 60 in an opposite direction will cause needle 68 to partially withdraw from fluid outlet passage 92.

The flowrate of fluid F into and out of pressurization chamber 94 will decrease as needle 68 moves further into fluid outlet passage 92. A decreased flowrate of fluid F into pressurization chamber 94 will increase the amount of time it takes for pressure to build in pressurization chamber 94. This will cause pneumatic timing valve 24 to remain in the supply state for a longer period of time. A lower flowrate of fluid F out of pressurization chamber 94 will also increase the amount of time it takes for the pressure in pressurization chamber 94 to drop. This will increase the amount of time it takes for spring 52 to move piston 38 upward. This will cause pneumatic timing valve 24 to remain in the exhaust state for a longer period of time. Pneumatic timing valve 24 will alternate between the supply state and the exhaust state less frequently as needle 68 moves further into fluid outlet passage 92. This will cause pneumatic pump 22 to reciprocate less frequently and to dispense chemicals at a lower rate.

The flowrate of fluid F into and out of pressurization chamber 94 will increase as needle 68 moves further out of fluid outlet passage 92. This will decrease the amount of time it takes for pressure to build in pressurization chamber 94 causing pneumatic timing valve 24 to remain in the supply state for a shorter period of time. An increased flowrate of fluid F out of pressurization chamber 94 will also reduce the amount of time it takes for the pressure in pressurization chamber 94 to drop. This will cause pneumatic timing valve 24 to remain in the exhaust state for a shorter period of time. Pneumatic timing valve 24 will alternate between the supply state and the exhaust state more frequently as needle 68 is withdrawn from fluid outlet passage 92. This will cause pneumatic pump 22 to reciprocate more quickly and to dispense chemicals at a greater rate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pneumatic timing valve comprising:
   a housing comprising:
      a main bore having a first end and a second end;
      a vent hole extending through the housing into the main bore;
      a fluid inlet port;
      a fluid inlet passage that connects the fluid inlet port and the main bore;
      a fluid outlet port;
      a fluid outlet passage that connects the fluid outlet port and the main bore; and
      a fluid exhaust port that intersects the main bore;
   a spool positioned within the housing and movable with respect to the housing between a first position and a second position, the spool comprising:
      fluid passages within the spool and movable with the spool to connect the fluid inlet passage to the fluid outlet passage when the spool is in the first position and to connect the fluid outlet passage and the fluid exhaust port when the spool is in the second position, wherein the fluid passages of the spool comprise:
         a central bore having a closed end; and
         radial ports that intersect the central bore;
         wherein the radial ports complement the fluid inlet passage and the fluid outlet passage of the housing;
   a pressurization chamber defined in the main bore between the spool and the first end of the main bore, wherein the pressurization chamber is connected to the fluid outlet passage;
   a spring positioned so that the spring biases the spool toward the pressurization chamber; and
   a vented chamber in the main bore between the pressurization chamber and at least one of the fluid passages in the spool, the vented chamber being in communication with an inner end of the vent hole;
   wherein fluid pressure in the pressurization chamber causes the spool to move from the first position to the second position when force applied to the spool by fluid pressure in the pressurization chamber overcomes the force applied to the spool by the spring;
   wherein force applied to the spool by the spring causes the spool to move to the first position when force applied to the spool by the spring overcomes the force applied to the spool by fluid pressure in the pressurization chamber; and
   wherein the pneumatic timing valve moves from the first position to the second position and from the second position to the first position based primarily on a difference between fluid pressure produced by fluid flowing through the pneumatic timing valve and pressure produced by the spring and without any electrical actuation.

2. The pneumatic timing valve of claim 1, further comprising:
   a needle valve comprising:
     a rotatable knob; and
     a needle connected to the rotatable knob for controlling fluid flow to and from the pressurization chamber, wherein the needle is positioned partly in the fluid outlet passage;
   wherein rotation of the rotatable knob in a first direction increases a flow of fluid to and from the pressurization chamber and wherein rotation of the rotatable knob in a second direction decreases the flow of fluid to and from the pressurization chamber.

3. The pneumatic timing valve of claim 1, wherein the fluid outlet passage, the main bore, the central bore of the spool, and the radial ports of the spool define a fluid flow path between the fluid inlet port and the fluid outlet port when the spool is in the first position.

4. The pneumatic timing valve of claim 1, wherein the fluid outlet passage, the main bore, the central bore of the spool, and the radial ports of the spool define a fluid flow path between the fluid outlet port and the fluid exhaust port when the spool is in the second position.

5. The pneumatic timing valve of claim 1, further comprising:
   a first seal cartridge surrounding the spool and having an annular body with radial ports that complement the radial ports of the spool.

6. The pneumatic timing valve of claim 5, wherein the first seal cartridge further comprises:
   a seal seat; and
   a cartridge seal positioned on the seal seat, the cartridge seal comprising:
     an energizer o-ring; and
     a seal ring positioned inside the energizer o-ring, wherein the seal ring is forced against the spool by the energizer o-ring creating a seal.

7. A fluid dispensing system comprising:
   a pneumatic pump;
   a pneumatic timing valve connected to the pneumatic pump to control pump speed, the pneumatic timing valve comprising:
     a housing comprising:
       a main bore having a first end and a second end;
       a vent hole extending through the housing into the main bore;
       a fluid inlet port;
       a fluid inlet passage that connects the fluid inlet port and the main bore;
       a fluid outlet port;
       a fluid outlet passage that connects the fluid outlet port and the main bore; and
       a fluid exhaust port that intersects the main bore;
     a spool positioned within the housing and movable with respect to the housing between a first position and a second position, the spool comprising:
       one or more fluid passages within the spool and movable with the spool to connect the fluid inlet passage to the fluid outlet passage when the spool is in the first position and to connect the fluid outlet passage and the fluid exhaust port when the spool is in the second position, wherein the fluid passages of the spool comprise:
         a central bore having a closed end; and
         radial ports that intersect the central bore;
       wherein the radial ports complement the fluid inlet passage and the fluid outlet passage of the housing;
     a pressurization chamber defined in the main bore between the spool and the first end of the main bore, wherein the pressurization chamber is connected to the fluid outlet passage;
     a spring positioned so that the spring biases the spool toward the pressurization chamber; and
     a vented chamber in the main bore between the pressurization chamber and at least one of the one or more fluid passages in the spool, the vented chamber being in communication with an inner end of the vent hole;
   wherein fluid pressure in the pressurization chamber causes the spool to move from the first position to the second position when force applied to the spool by fluid pressure in the pressurization chamber overcomes the force applied to the spool by the spring;
   wherein force applied to the spool by the spring causes the spool to move to the first position when force applied to the spool by the spring overcomes the force applied to the spool by fluid pressure in the pressurization chamber; and
   wherein the pneumatic timing valve moves from the first position to the second position and from the second position to the first position based primarily on a difference between fluid pressure produced by fluid flowing through the pneumatic timing valve and pressure produced by the spring and without any electrical actuation.

8. The fluid dispensing system of claim 7, further comprising:
   a needle valve comprising:
     a rotatable knob; and
     a needle connected to the rotatable knob for controlling fluid flow to and from the pressurization chamber, wherein the needle is positioned partly in the fluid outlet passage;
   wherein rotation of the rotatable knob in a first direction increases a flow of fluid to and from the pressurization chamber and wherein rotation of the rotatable knob in a second direction decreases the flow of fluid to and from the pressurization chamber.

9. The fluid dispensing system of claim 7, wherein the fluid outlet passage, the main bore, the central bore of the spool, and the radial ports of the spool define a fluid flow path between the fluid inlet port and the fluid outlet port when the spool is in the first position.

10. The fluid dispensing system of claim 7, wherein the fluid outlet passage, the main bore, the central bore of the spool, and the radial ports of the spool define a fluid flow path between the fluid outlet port and the fluid exhaust port when the spool is in the second position.

11. The fluid dispensing system of claim 7, further comprising:
    a first seal cartridge surrounding the spool and having an annular body with radial ports that complement the radial ports of the spool.

12. The fluid dispensing system of claim 11, further comprising:
    a second seal cartridge surrounding the spool and having an annular body with radial ports that complement the radial ports of the spool; and
    a seal cartridge spacer positioned between the first and second seal cartridges and surrounding the spool, the seal cartridge spacer having an annular body having radial ports that complement the radial ports of the spool.

13. A pneumatic timing valve comprising:
a housing comprising:
  a main bore having a first end and a second end;
  a vent hole extending through the housing into the main bore;
  a fluid inlet port;
  a fluid inlet passage that connects the fluid inlet port and the main bore;
  a fluid outlet port;
  a fluid outlet passage that connects the fluid outlet port and the main bore; and
  a fluid exhaust port that intersects the main bore;
a spool positioned within the housing and movable with respect to the housing between a first position and a second position, the spool comprising:
  fluid passages configured to connect the fluid inlet passage to the fluid outlet passage when the spool is in the first position and to connect the fluid outlet passage and the fluid exhaust port when the spool is in the second position, wherein the fluid passages of the spool comprise:
    a central bore; and
    radial ports that intersect the central bore;
    wherein the radial ports complement the fluid inlet passage and the fluid outlet passage of the housing;
a first seal cartridge surrounding the spool and having an annular body with radial ports that complement the radial ports of the spool;
a second seal cartridge surrounding the spool and having an annular body with radial ports that complement the radial ports of the spool; and
a seal cartridge spacer positioned between the first and second seal cartridges and surrounding the spool, the seal cartridge spacer having an annular body having radial ports that complement the radial ports of the spool;
a pressurization chamber defined in the main bore between the spool and the first end of the main bore, wherein the pressurization chamber is connected to the fluid outlet passage;
a spring positioned so that the spring biases the spool toward the pressurization chamber; and
a vented chamber in the main bore between the pressurization chamber and at least one of the fluid passages in the spool, the vented chamber being in communication with an inner end of the vent hole;
wherein fluid pressure in the pressurization chamber causes the spool to move from the first position to the second position when force applied to the spool by fluid pressure in the pressurization chamber overcomes the force applied to the spool by the spring;
wherein force applied to the spool by the spring causes the spool to move to the first position when force applied to the spool by the spring overcomes the force applied to the spool by fluid pressure in the pressurization chamber; and
wherein the pneumatic timing valve moves from the first position to the second position and from the second position to the first position based primarily on a difference between fluid pressure produced by fluid flowing through the pneumatic timing valve and pressure produced by the spring and without any electrical actuation.

14. A fluid dispensing system comprising:
a pneumatic pump;
a pneumatic timing valve connected to the pneumatic pump to control pump speed, the pneumatic timing valve comprising:
  a housing comprising:
    a main bore having a first end and a second end;
    a vent hole extending through the housing into the main bore;
    a fluid inlet port;
    a fluid inlet passage that connects the fluid inlet port and the main bore;
    a fluid outlet port;
    a fluid outlet passage that connects the fluid outlet port and the main bore; and
    a fluid exhaust port that intersects the main bore;
  a spool positioned within the housing and movable with respect to the housing between a first position and a second position, the spool comprising:
    one or more fluid passages configured to connect the fluid inlet passage to the fluid outlet passage when the spool is in the first position and to connect the fluid outlet passage and the fluid exhaust port when the spool is in the second position, wherein the fluid passages of the spool comprise:
      a central bore; and
      radial ports that intersect the central bore;
      wherein the radial ports complement the fluid inlet passage and the fluid outlet passage of the housing;
  a first seal cartridge surrounding the spool and having an annular body with radial ports that complement the radial ports of the spool, wherein the first seal cartridge further comprises:
    a seal seat; and
    a cartridge seal positioned on the seal seat, the cartridge seal comprising:
      an energizer o-ring; and
      a seal ring positioned inside the energizer o-ring, wherein the seal ring is forced against the spool by the energizer o-ring creating a seal
  a pressurization chamber defined in the main bore between the spool and the first end of the main bore, wherein the pressurization chamber is connected to the fluid outlet passage;
  a spring positioned so that the spring biases the spool toward the pressurization chamber; and
  a vented chamber in the main bore between the pressurization chamber and at least one of the one or more fluid passages in the spool, the vented chamber being in communication with an inner end of the vent hole;
  wherein fluid pressure in the pressurization chamber causes the spool to move from the first position to the second position when force applied to the spool by fluid pressure in the pressurization chamber overcomes the force applied to the spool by the spring;
  wherein force applied to the spool by the spring causes the spool to move to the first position when force applied to the spool by the spring overcomes the force applied to the spool by fluid pressure in the pressurization chamber; and
  wherein the pneumatic timing valve moves from the first position to the second position and from the second position to the first position based primarily on a difference between fluid pressure produced by fluid flowing through the pneumatic timing valve and pressure produced by the spring and without any electrical actuation.

15. A fluid dispensing system comprising:
a pneumatic pump;
a pneumatic timing valve connected to the pneumatic pump to control pump speed, the pneumatic timing valve comprising:
 a housing comprising:
  a main bore having a first end and a second end;
  a fluid inlet port;
  a fluid inlet passage that connects the fluid inlet port and the main bore;
  a fluid outlet port;
  a fluid outlet passage that connects the fluid outlet port and the main bore; and
  a fluid exhaust port that intersects the main bore;
 a spool positioned within the housing and movable between a first position and a second position, the spool comprising:
  one or more fluid passages within the spool and movable with the spool to connect the fluid inlet passage to the fluid outlet passage when the spool is in the first position and to connect the fluid outlet passage and the fluid exhaust port when the spool is in the second position;
  wherein the fluid passages of the spool comprise:
   a central bore having a closed end; and
   radial ports that intersect the central bore;
    wherein the radial ports complement the fluid inlet passage and the fluid outlet passage of the housing;
 a pressurization chamber defined in the main bore between the spool and first end of the main bore, wherein the pressurization chamber is connected to the fluid outlet passage; and
 a spring positioned so that the spring biases the spool toward the pressurization chamber;
 wherein the fluid outlet passage, the main bore, the central bore of the spool, and the radial ports of the spool define a fluid flow path between the fluid inlet port and the fluid outlet port when the spool is in the first position; and
 wherein pressure in the pressurization chamber causes the spool to move from the first position to the second position when force applied to the spool by pressure in the pressurization chamber overcomes the force applied to the spool by the spring.

* * * * *